(12) United States Patent
Sugiyama et al.

(10) Patent No.: US 9,231,728 B2
(45) Date of Patent: Jan. 5, 2016

(54) OPTICAL MODULE AND OPTICAL TRANSMITTER

(71) Applicant: Fujitsu Optical Components Limited, Kawasaki-shi, Kanagawa (JP)

(72) Inventors: Masaki Sugiyama, Sagamihara (JP); Seimi Sasaki, Sagamihara (JP); Takehito Tanaka, Yokohama (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 14/324,552

(22) Filed: Jul. 7, 2014

(65) Prior Publication Data

US 2015/0063809 A1    Mar. 5, 2015

(30) Foreign Application Priority Data

Aug. 29, 2013 (JP) .................................. 2013-177697

(51) Int. Cl.
| | |
|---|---|
| H04B 10/00 | (2013.01) |
| H04J 14/06 | (2006.01) |
| G02F 1/01 | (2006.01) |
| G02F 1/225 | (2006.01) |
| G02F 1/21 | (2006.01) |

(52) U.S. Cl.
CPC .............. *H04J 14/06* (2013.01); *G02F 1/0121* (2013.01); *G02F 1/2255* (2013.01); *G02F 2001/212* (2013.01); *G02F 2201/127* (2013.01)

(58) Field of Classification Search
USPC ................................................ 398/182–201
See application file for complete search history.

(56) References Cited

U.S. PATENT DOCUMENTS

| | | | | |
|---|---|---|---|---|
| 5,042,895 | A * | 8/1991 | Chouinard et al. | ............... 385/2 |
| 5,148,503 | A * | 9/1992 | Skeie | ................ 385/3 |
| 5,208,697 | A * | 5/1993 | Schaffner et al. | ............. 359/254 |
| 5,291,565 | A * | 3/1994 | Schaffner et al. | ................ 385/3 |
| 6,192,167 | B1 * | 2/2001 | Kissa et al. | ........................ 385/3 |
| 6,483,953 | B1 * | 11/2002 | McBrien et al. | .................... 385/2 |
| 6,571,026 | B2 * | 5/2003 | Kondo et al. | .................... 385/2 |
| 6,580,843 | B2 * | 6/2003 | Doi et al. | ........................ 385/14 |
| 6,584,240 | B2 * | 6/2003 | Doi et al. | ........................ 385/2 |
| 6,590,691 | B1 * | 7/2003 | Nagra et al. | .................. 359/237 |

(Continued)

FOREIGN PATENT DOCUMENTS

| | | |
|---|---|---|
| JP | 5-289034 | 11/1993 |
| JP | 2002-232060 | 8/2002 |

(Continued)

*Primary Examiner* — Agustin Bello
(74) *Attorney, Agent, or Firm* — Staas & Halsey LLP (57) ABSTRACT

An optical module includes a waveguide substrate having an optical waveguide and electrodes that apply electronic signals to the optical waveguide; a relay substrate disposed adjacently to the waveguide substrate; and a termination substrate disposed sandwiching the waveguide substrate with the relay substrate. The electrodes respectively have a first wiring portion connected from the relay substrate through the waveguide substrate to the termination substrate and a second wiring portion extending from the first wiring portion and branching on the termination substrate. In the second wiring portion, one branched wiring portion has a capacitor and a termination resistor, and another branched wiring portion extends through a bias resistor to a DC electrode on the relay substrate. The second wiring portion is divided into a first group extending in a first direction along the optical waveguide and a second group extending in a direction opposite to the first direction.

21 Claims, 9 Drawing Sheets

(56) References Cited

U.S. PATENT DOCUMENTS

| | | | |
|---|---|---|---|
| 6,678,428 B2* | 1/2004 | Seino et al. | 385/2 |
| 6,734,755 B2* | 5/2004 | Cites et al. | 333/33 |
| 6,741,378 B2* | 5/2004 | Sugiyama et al. | 359/245 |
| 6,867,901 B2* | 3/2005 | Sugiyama et al. | 359/322 |
| 6,961,494 B2* | 11/2005 | Tanaka | 385/40 |
| 7,162,107 B2* | 1/2007 | Bull et al. | 385/2 |
| 7,212,326 B2* | 5/2007 | Wooten et al. | 359/245 |
| 7,245,788 B2* | 7/2007 | Fujita et al. | 385/3 |
| 8,031,987 B2* | 10/2011 | Shimizu et al. | 385/2 |
| 8,068,703 B2* | 11/2011 | Shimizu et al. | 385/2 |
| 8,135,242 B2* | 3/2012 | Sugiyama | 385/2 |
| 8,380,015 B2* | 2/2013 | Kinpara et al. | 385/2 |
| 8,792,752 B2* | 7/2014 | Shimizu et al. | 385/2 |
| 2002/0109897 A1* | 8/2002 | Mirshekar-Syahkal et al. | 359/245 |
| 2007/0200218 A1 | 8/2007 | Mukaibara | |
| 2009/0252500 A1* | 10/2009 | Shimizu et al. | 398/183 |
| 2011/0026868 A1* | 2/2011 | Shimizu et al. | 385/2 |
| 2015/0063809 A1* | 3/2015 | Sugiyama et al. | 398/65 |
| 2015/0078763 A1* | 3/2015 | Sugiyama et al. | 398/200 |

FOREIGN PATENT DOCUMENTS

| | | |
|---|---|---|
| JP | 2003-295139 | 10/2003 |
| JP | 2004-226769 | 8/2004 |
| JP | 2007-81364 | 3/2007 |

* cited by examiner

OPTICAL MODULE AND OPTICAL TRANSMITTER

CROSS REFERENCE TO RELATED APPLICATIONS

This application is based upon and claims the benefit of priority of the prior Japanese Patent Application No. 2013-177697, filed on Aug. 29, 2013, the entire contents of which are incorporated herein by reference.

FIELD

The embodiments discussed herein are related to an optical module and an optical transmitter used in optical transmission.

BACKGROUND

Optical modules include, for example, an optical waveguide device that uses an electro-optical crystal substrate such as a $LiNbO_3$ (LN) substrate and a $LiTaO_2$ substrate or a semiconductor substrate such as a GaAs substrate and an InP substrate. The optical waveguide device has an optical waveguide formed by forming and thermally diffusing a metal film of titanium (Ti), etc. on a portion of the substrate. Alternatively, the optical waveguide is formed by proton exchange in benzoic acid after patterning. Subsequently, electrodes can be disposed near the optical waveguide to form an optical module such as an optical modulator.

If such an optical modulator is driven at high speed, terminals of a signal electrode and a ground electrode are connected by a resistor to form a traveling-wave electrode and a high-speed microwave signal (electronic signal) is applied to an RF terminal from the input side. In this case, an electric field changes refraction indexes of a pair of parallel waveguides A and B toward $+\Delta$ and $-\Delta$, respectively, and a phase difference is changed between the parallel waveguides A and B. As a result, a signal light modulated in intensity is output from an exist waveguide due to Mach-Zehnder interference.

High-speed optical response characteristics can be obtained by matching speeds of light and the high-speed microwave signal (electronic signal). After passing through the optical modulator, the electronic signal passes through a capacitor and is terminated by a termination resistor. An electrode is divided before the capacitor and one branch is connected through a bias resistor to a DC terminal while the other is terminated by the termination resistor. This configuration acts as bias and, when voltage is applied to the DC terminal, a bias point and drive voltage of a Mach-Zehnder unit can be controlled.

Such an optical modulator has a Mach-Zehnder modulating unit and a relay substrate to which an electronic signal for driving the Mach-Zehnder unit is input. The relay substrate relates to, for example, a technique of disposing the Mach-Zehnder modulating unit between a signal input substrate and a signal termination substrate equipped with a termination resistor (see, e.g., Japanese Laid-Open Patent Publication No. 2004-226769) and a technique of mounting a signal input circuit and a signal termination circuit on one circuit substrate (see, e.g., Japanese Laid-Open Patent Publication No. H5-289034).

Recently, optical communication is further multivalued and polarization-multiplexed so as to achieve a larger capacity and the configuration of modulators is increasingly complicated. For example, also in a modulator, a modulation mode is used that generates a signal multivalued and polarization-multiplexed by disposing two sets of Mach-Zehnder modulating units having a pair of parallel waveguides and inputting independent signals to the two sets of the Mach-Zehnder modulating units.

However, in a configuration having two sets of the Mach-Zehnder modulating units, the number of signal paths of electronic signals is doubled on the substrate of the Mach-Zehnder modulating units and a given space is required for layout of the signal paths. The numbers of RF terminals, DC terminals, capacitors, bias resistors, and termination resistors are accordingly doubled on a relay substrate and space is required for mounting. Therefore, the relay substrate is increased in size, for example, in the length direction along the parallel waveguides of the Mach-Zehnder modulating units, causing a problem of an increased size of a module that includes the modulator.

SUMMARY

According to an aspect of an embodiment, an optical module includes a waveguide substrate having an optical waveguide and multiple electrodes causing electronic signals to be applied to the optical waveguide; a relay substrate disposed adjacently to the waveguide substrate; and a termination substrate disposed adjacently to the waveguide substrate on a side opposite to the relay substrate and thereby, sandwiching the waveguide substrate therebetween. The electrodes respectively have a first wiring portion connected from the relay substrate through the waveguide substrate to the termination substrate and a second wiring portion extending from the first wiring portion and branching on the termination substrate. In the second wiring portion, one branched wiring portion has a capacitor and a termination resistor and another branched wiring portion is extended through a bias resistor to a DC electrode on the relay substrate. The second wiring portion is divided into a first group extending in a first direction along the optical waveguide and a second group extending in a direction opposite to the first direction.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments of an optical module and an optical transmitter will be described in detail with reference to the accompanying drawings.

Figure 1:
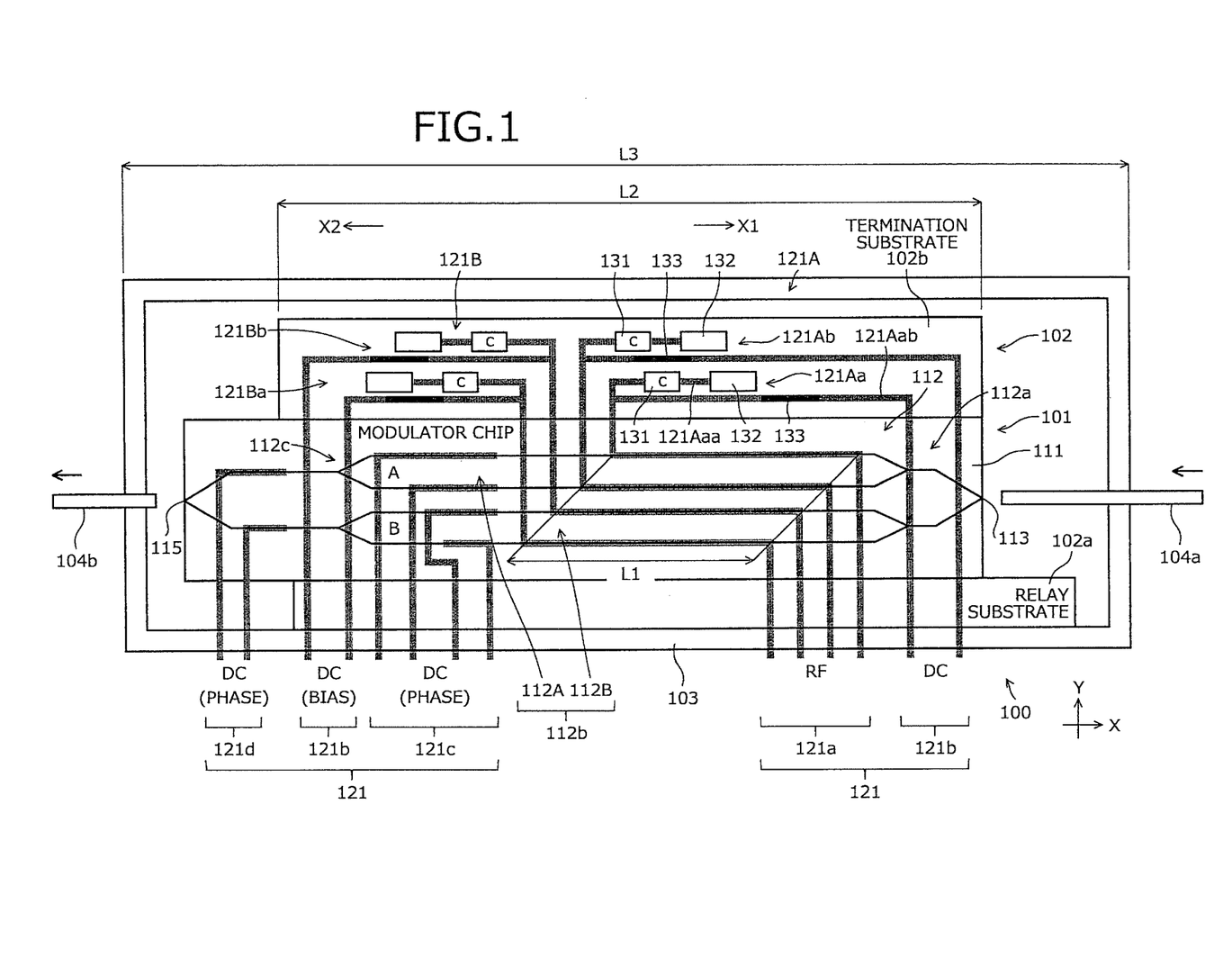
FIG. 1 is a plane view of an optical module according to a first embodiment.

FIG. 1 is a plane view of an optical module according to a first embodiment. An optical module 100 depicted in FIG. 1 is a configuration example of a QPSK optical modulator and includes a Mach-Zehnder modulating unit (modulator chip) 101, an electrode substrate 102, a housing (package) 103 housing these elements, and input/output optical fibers 104 (104a, 104b). The electrode substrate 102 has multiple terminals (RF terminals and DC terminals described later).

The Mach-Zehnder modulating unit 101 includes an optical waveguide 112 formed on a waveguide substrate 111 consisting of an electro-optical crystal substrate such as a $LiNbO_3$ (LN) substrate and a $LiTaO_2$ substrate or a semiconductor substrate such as GaAs and InP, and electrodes 121.

The optical waveguide 112 includes input waveguides 112a disposed closer to the optical fiber 104a, parallel waveguides (Mach-Zehnder interference units A, B) 112b along the electrodes 121, and output waveguides 112c.

Input light from the optical fiber 104a is divided into two branches for two sets of the Mach-Zehnder interference units A, B (parallel waveguides 112A, 112B) by a branching unit 113 of the input waveguide 112a portion.

The two sets of the Mach-Zehnder interference units A, B (parallel waveguides 112A, 112B) are respectively divided into two branches and a pair of the parallel waveguides 112b and the electrodes 121 are disposed in parallel to the parallel waveguides 112b such that data on the electrodes 121 is modulated on optical signals.

The output waveguides 112c downstream to a pair of the parallel waveguides 112b multiplexes (performs polarization multiplexing of) modulation components of optical signals from a pair of the Mach-Zehnder interference units A, B and outputs the multiplexed modulation components to the optical fiber 104b.

Couplers for optical coupling can be used for the branching unit 113 and a multiplexing unit 115. The optical waveguide 112 at the end portions of the waveguide substrate 111 is optically coupled to the optical fibers 104a, 104b on the input side and output side through spatial propagation via optical elements such as lenses not depicted.

The electrodes 121 are disposed as electrodes along the Mach-Zehnder interference units A, B (parallel waveguides 112A, 112B) of the optical waveguide 112. Ground electrodes not depicted are disposed on both sides of the electrodes, at a portion that corresponds to the Mach-Zehnder interference units A, B (parallel waveguides 112A, 112B) to form coplanar electrodes.

The example depicted in FIG. 1 has the two parallel waveguides 112A for one of the Mach-Zehnder interference units A and the two electrodes 121 are correspondingly disposed along the parallel waveguides 112A. Therefore, the four electrodes 121 are disposed in total along a pair of the parallel waveguides 112A, 112B for a pair of the Mach-Zehnder interference units A, B. In the example depicted in FIG. 1, a total of two sets are disposed as a set consisting of a pair of the Mach-Zehnder interference units A and a pair of the electrodes 121 and a set consisting of a pair of the Mach-Zehnder interference units B and a pair of the electrodes 121. The electrodes 121 of the Mach-Zehnder interference units A, B all have the same length (operation length) L1 and are arranged in parallel.

The electrode substrate 102 depicted in FIG. 1 is disposed as two substrates, i.e., a relay substrate 102a on one side and a termination substrate 102b on the other side with the waveguide substrate 111 of the Mach-Zehnder modulating unit 101 therebetween. The electrode substrate 102 consisting of the relay substrate 102a and the termination substrate 102b may be made up not only of separated substrates as depicted but also of one substrate (a carrier 302 described later). If the relay substrate 102a and the termination substrate 102b are made up of one substrate, a recess is formed at the electrode substrate 102 portion of the Mach-Zehnder modulating unit 101 and the Mach-Zehnder modulating unit 101 is disposed in this recess portion (details of a specific example will be described later).

The relay substrate 102a is disposed to lead out the end portions of the electrodes 121 to the housing (package) 103. The electrodes 121 include four RF electrodes 121a and four DC electrodes 121b for bias. The electrodes 121 also include four DC electrodes 121c for off-point adjustment and two DC electrodes 121d for phase adjustment.

The four RF electrodes 121a and the four DC electrodes 121b are assigned as the two RF electrodes 121a and the two DC electrodes 121b per set of the Mach-Zehnder interference units A, B (parallel waveguides 112A, 112B) of the optical waveguide 112.

A connection configuration of the electrodes 121 will be described in order from the input side. The end portions of the RF electrodes 121a are connected to RF terminals of the housing 103 to input transmission data as high-speed electronic signals (microwave signals) from the RF terminals. Given data for transmission is input to a pair of the RF electrodes 121a corresponding to a pair of the Mach-Zehnder interference units A of one set, and other given data is input separately to a pair of the RF electrodes 121a corresponding to another pair of the Mach-Zehnder interference units B of the other set.

The electrodes 121a are connected from the relay substrate 102a to the Mach-Zehnder modulating unit 101 and the electronic signals are data-converted (modulated) into optical signals at the portion corresponding to the Mach-Zehnder interference units A, B (parallel waveguides 112A, 112B) of the optical waveguide 112.

The RF electrodes 121a are subsequently connected from the Mach-Zehnder modulating unit 101 to the termination substrate 102b (first wiring portion). On the termination substrate 102b, the electrodes 121 are divided into two branches (second wiring portion).

In the second wiring portion, the one branched electrode 121 (one wiring portion 121Aaa) is RF-terminated through a capacitor 131 by a terminal resistor (50Ω) 132.

The other branched electrode 121 (the other wiring portion 121Aab) is used as the DC electrode 121b for bias through a bias resistor 133 of high resistance (several hundred to several kΩ). This DC electrode 121b is connected to a DC terminal of the housing 103 through the termination substrate 102b, the waveguide substrate 111 of the Mach-Zehnder modulating unit 101, and the relay substrate 102a. The Mach-Zehnder modulating unit 101 can be controlled in terms of a bias point through variable voltage by applying and varying a given voltage to this DC terminal.

The DC electrodes 121c for phase adjustment are disposed parallel to a total of four waveguides at the rear portions of the four parallel waveguides 112b making up the two sets of the Mach-Zehnder interference units A, B (parallel waveguides 112A, 112B) and are led out to the relay substrate 102a. The off point (operation point) of the Mach-Zehnder modulating unit (Mach-Zehnder interference units A, B) 101 can be subjected to the phase control by applying voltage to the DC electrodes 121c for phase adjustment.

The DC electrodes 121d for phase adjustment are disposed parallel to a total of two waveguides, on the output waveguides 112c downstream from two sets of the Mach-Zehnder interference units A, B (parallel waveguides 112A, 112B) of the parallel waveguides 112b and are led out to the relay substrate 102a. The respective phases of the pair of output waveguides 112c are controlled to be orthogonal to each other by applying voltage to the DC electrodes 121d for phase adjustment.

The layout of the multiple electrodes 121 on the termination substrate 102b depicted in FIG. 1 will be described. The two electrodes 121A (first group: 121Aa, 121Ab) on the one Mach-Zehnder interference unit A side are disposed to be folded into an L-shape in a first direction (X1 direction in FIG. 1) along the parallel waveguides 112A, 112B on the termination substrate 102b.

Describing the branching and disposition of the electrode 121Aa in order of a signal path, the capacitor 131 and the terminal resistor (50Ω) 132 on the branched electrode 121Aaa are disposed in the X1 direction. The bias resistor 133 on the other branched electrode 121Aab is disposed in the X1 direction same as the capacitor 131 and the terminal resistor (50Ω) 132. The bias resistor 133 is disposed parallel to the capacitor 131 and the terminal resistor 132 in a width direction (Y-axis direction) of the housing 103. The capacitor 131, the terminal resistor 132, and the bias resistor 133 on the other electrode 121Ab side are disposed in the X1 and Y-axis directions as is the case with the electrode 121Aa.

On the other hand, the two electrodes 121B (second group: 121Ba, 121Bb) on the other Mach-Zehnder interference unit B side are disposed to be folded into an L-shape in a second direction (X2 direction in FIG. 1) opposite to the folding direction (X1) of the electrodes 121A (first group). The capacitor 131, the terminal resistor 132, and the bias resistor 133 disposed on the electrodes 121Ba, 121Bb are also disposed in the X2 direction.

As described above, the wiring portions of the multiple (four) electrodes 121 are divided into two groups on the electrode 121A side and the electrode 121B side, on the termination substrate 102b. The wiring layouts of the one divided electrode 121A (first group: 121Aa, 121Ab) side and the other electrode 121B (second group: 121Ba, 121Bb) side are disposed in the directions (X1, X2) opposite to each other along the length (X-axis) direction.

In the example depicted in FIG. 1, when viewed in the length (X-axis) direction, the one electrode 121A (first group) side is disposed at a position overlapping the operation length L1 of the Mach-Zehnder interference units A, B. Although the wiring layouts are described, it is important for the disposition of the bias resistors 133 requiring a given region that the bias resistors 133 are disposed in opposite directions on the respective divided electrodes. Because of the high resistance (several hundred to several kΩ), the bias resistors 133 require a given area on the termination substrate 102b and are therefore disposed in a distributed manner.

Since the four electrodes 121 are divided into two groups and disposed in a distributed manner in the length directions (X1, X2) of the housing 103, the size of the termination substrate 102b can be suppressed (an increase in the X-axis direction).

Therefore, according to the first embodiment, since a length L2 of the termination substrate 102b can be reduced, a length L3 of the housing 130 including and housing the termination substrate 102b can be reduced and as well as the size.

Figure 2:
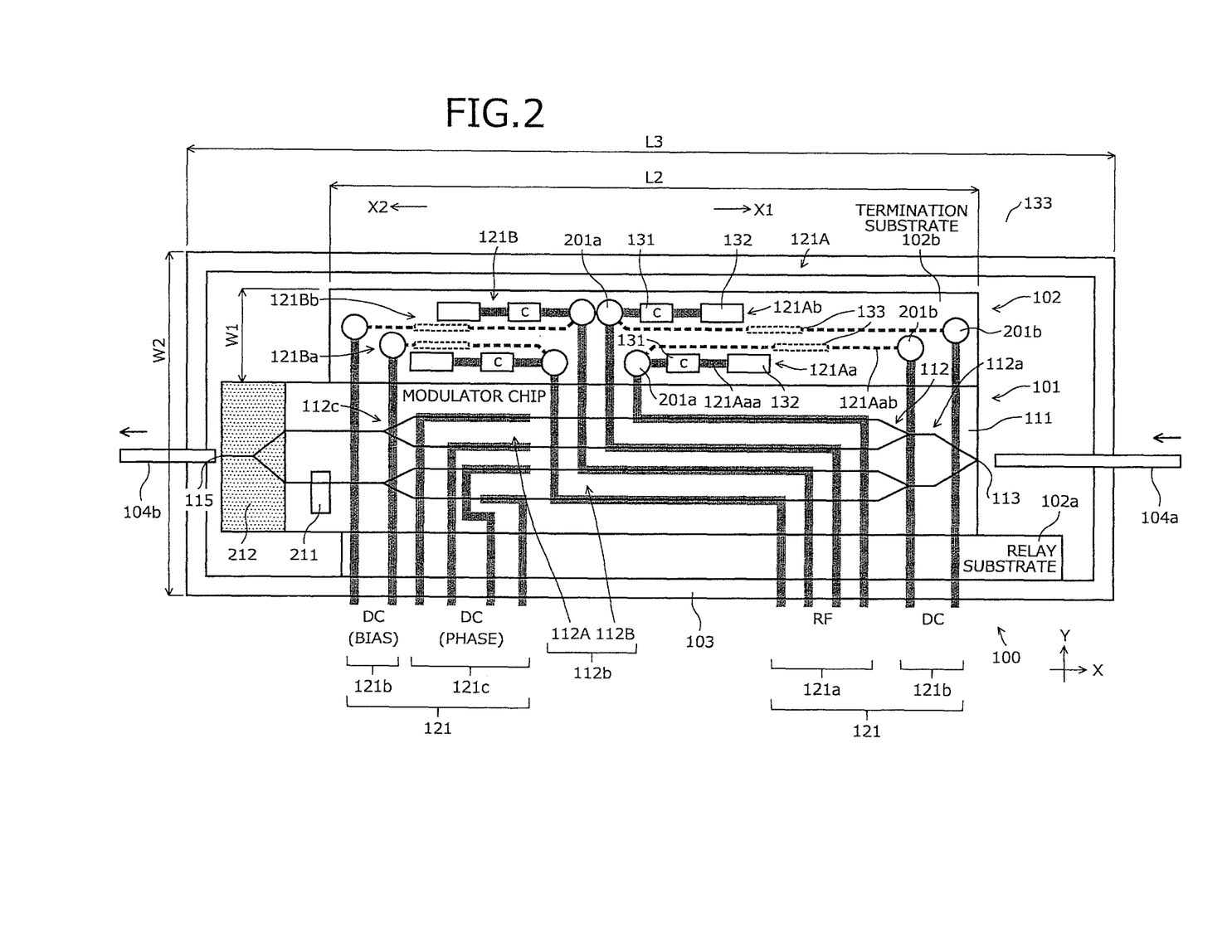
FIG. 2 is a plane view of the optical module according to a second embodiment.
Figure 3:
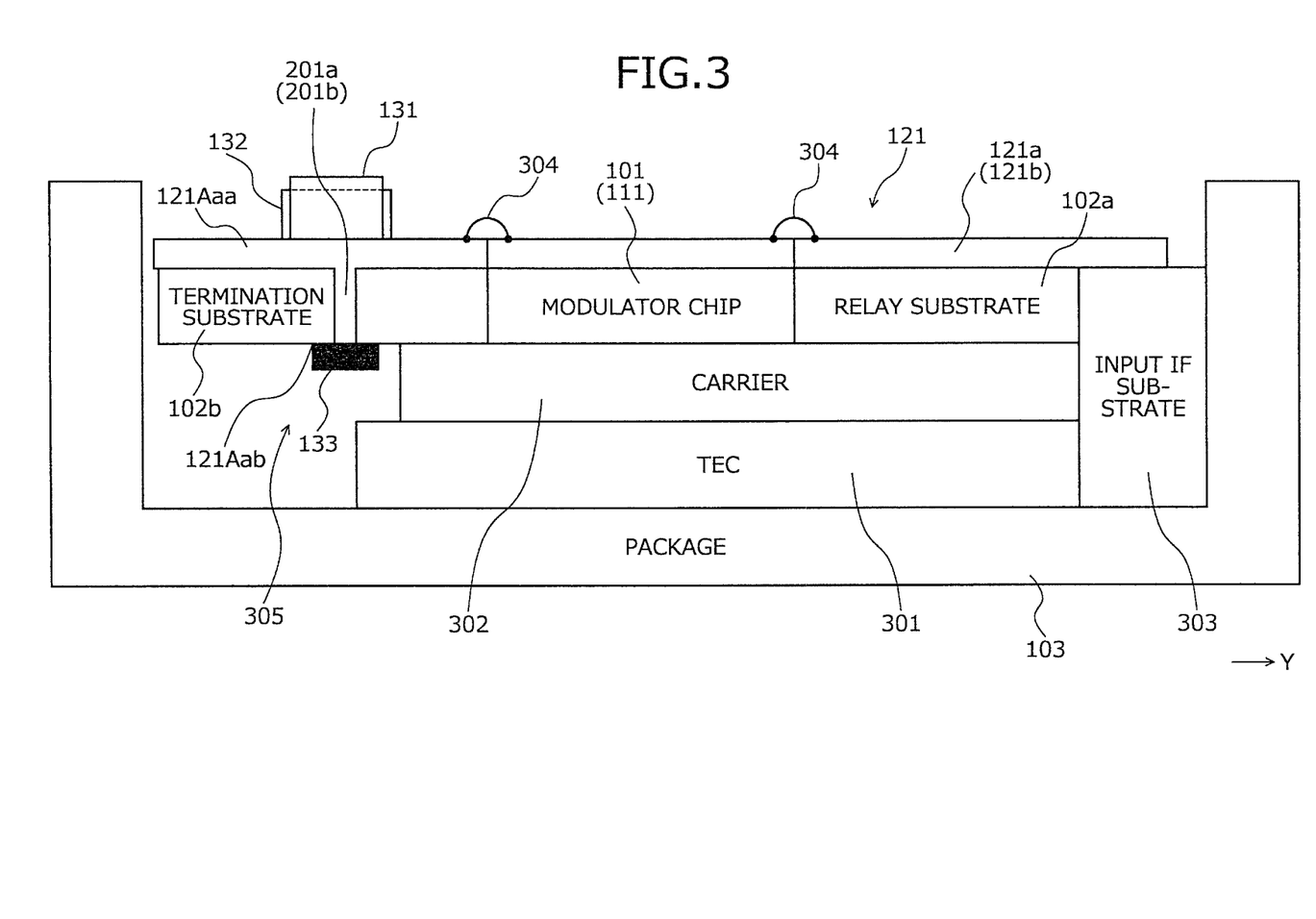
FIG. 3 is a side cross-sectional view of the optical module according to the second embodiment.

FIG. 2 is a plane view of the optical module according to a second embodiment and FIG. 3 is a side cross-sectional view of the optical module according to the second embodiment. In the second embodiment, the same constituent elements are denoted by the same reference numerals used in the first embodiment. The second embodiment is different from the first embodiment in the wiring layouts of the multiple electrodes 121 on the termination substrate 102b and the arrangement position of the terminal resistor 132.

The optical module 100 of the second embodiment is a configuration example of a DP-DPSK optical modulator, which is different from the QPSK modulator of the first embodiment. Therefore, in the second embodiment, a polarization rotating unit 211 is disposed on the output waveguide 112c, to rotate polarization on one waveguide to be orthogonal to the polarization direction of the other waveguide. A polarization multiplexing unit 212 is disposed at the multiplexing unit 115 portion. Both the first and second embodiments can selectively include a phase adjustment mechanism of the first embodiment or a polarization adjustment mechanism of the second embodiment 2 at the output waveguide 112c portion and can employ either modulation mode.

The branching and disposition of the one electrode 121Aa for the one Mach-Zehnder interference unit A will be described in order of a signal path. The capacitor 131 and the terminal resistor (50Ω) 132 on the one branched electrode, (one wiring portion) 121Aaa are disposed on the front surface of the termination substrate 102b in the X1 direction.

In the second embodiment, the other branched electrode (the other wiring potion) 121Aab is led out and connected to the electrode 121Aab on the back surface of the termination substrate 102b through a via 201a formed to penetrate the termination substrate 102b from the front surface to the back surface (dotted line of FIG. 2). The electrode 121Aab on the back surface of the termination substrate 102b includes the bias resistor 133.

Because of the high resistance (several hundred to several kΩ), the bias resistor 133 requires a given area on the termination substrate 102b. Therefore, in the second embodiment, the one electrode 121Aaa, the capacitor 131, and the terminal resistor 132 are disposed on the front surface of the termination substrate 102b, and the other electrode 121Aab and the bias resistor 133 are disposed on the back surface of the termination substrate 102b.

In FIG. 2, the electrode 121Aaa and the electrode 121Aab are depicted to be shifted in the width (Y-axis) direction without overlap for convenience. However, the one electrode 121Aaa, the capacitor 131, and the terminal resistor 132 on the front surface of the termination substrate 102b and the other electrode 121Aab and the bias resistor 133 on the back surface of the termination substrate 102b can be disposed at the same positions or substantially the same positions on the front and back of the termination substrate 102b.

The electrode 121Aab is led out through a via 201b to the front surface of the termination substrate 102b and is connected to the DC terminal of the housing 103 as the DC electrode 121b after passing through the bias resistor 133, via the termination substrate 102b, the waveguide substrate 111 of the Mach-Zehnder modulating unit 101, and the relay substrate 102a.

As depicted in FIG. 3, the optical module 100 has a carrier (substrate) 302 mounted on a temperature adjustment cooler (thermo-electric cooler (TEC)) 301 sequentially from a bottom surface inside the housing (package) 103. The bias resistor 133 is housed in a space 305 formed by the bottom surface of the housing 103, the back surface of the termination substrate 102b, and the side portions of the temperature adjustment cooler 301 and the carrier 302.

The waveguide substrate 111 of the Mach-Zehnder modulating unit 101 is mounted on the carrier 302. The relay substrate 102a and the termination substrate 102b are mounted on the carrier 302 with the waveguide substrate 111 of the Mach-Zehnder modulating unit 101 interposed therebetween.

The electrodes 121 (121a, 121b) are disposed at the same height position on the front surfaces of the relay substrate 102a, the waveguide substrate 111 of the Mach-Zehnder modulating unit 101, and the termination substrate 102b, and the electrodes 121 (121a, 121b) are electrically connected by wire bonding 304 between the relay substrate 102a and the waveguide substrate 111 and between the waveguide substrate 111 and the termination substrate 102b.

The temperature adjustment cooler 301 includes a temperature adjustment member such as a heat sink and a Peltier element, a temperature detection element, and a control circuit and provides temperature control such that constant temperature is achieved in the carrier 302 disposed on the upper surface, the relay substrate 102a, the termination substrate 102b, and the waveguide substrate 111 of the Mach-Zehnder modulating unit 101.

The electrodes 121 (the RF electrodes 121a, the DC electrodes 121b) of the relay substrate 102a are led out to terminals (not depicted) outside the housing 103 through an input IF substrate 303.

With regard to the disposition of the bias resistor 133, in the first embodiment described above, the bias resistor 133 is disposed to be shifted in the Y-axis direction so as not to overlap the capacitor 131 and the terminal resistor 132 as depicted in FIG. 1. On the other hand, according to the second embodiment depicted in FIG. 2, the bias resistor 133 is disposed on the back surface of the termination substrate 102b without disposing the bias resistor 133 on the front surface of the termination substrate 102b. Therefore, according to the second embodiment, a width W1 of the termination substrate 102b in the Y-axis direction can be reduced by an amount equivalent to the bias resistor 133 (and the DC electrode 121Aab) and the size in the width (Y-axis) direction can be reduced.

According to the second embodiment, the length L2 of the termination substrate 102b can be reduced as is the case with the first embodiment. Additionally, the DC electrodes 121b can efficiently be arranged by utilizing the front and back of the termination substrate 102b, and the width W1 of the termination substrate 102b can be made smaller as compared to the first embodiment. As a result, the housing 103 including and housing the termination substrate 102b can be made smaller with the length L3 as is the case with the first embodiment and a width W2 can be made shorter than the first embodiment so that further reductions in size can be achieved.

Even a configuration with the DC electrodes 121b disposed on the back surface of the termination substrate 102b can maintain high-frequency characteristics of the high-speed microwave signals without affecting the (RF) electrodes 121a for high-frequency signals.

Figure 4:
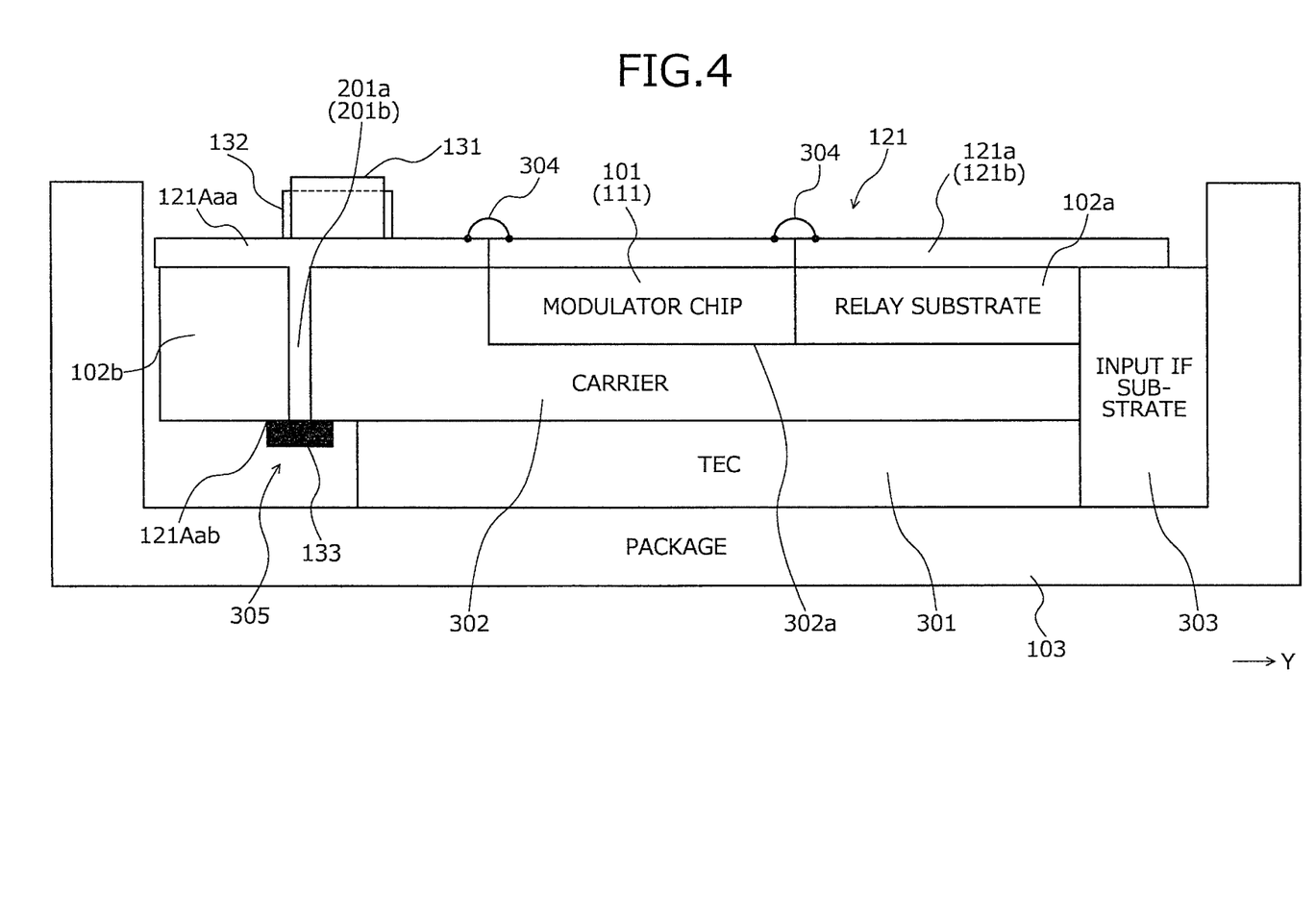
FIG. 4 is a side cross-sectional view of the optical module according to a third embodiment.

FIG. 4 is a side cross-sectional view of the optical module according to a third embodiment. In the third embodiment, the termination substrate 102b described in the second embodiment is integrally formed with the carrier 302. The other constituent elements are the same as the second embodiment. In the carrier 302, the arrangement position of the termination substrate 102b described in the embodiments is referred to as a termination portion 102b.

The carrier 302 is made up of a laminated substrate and has a step difference (groove) 302a corresponding to the heights of the relay substrate 102a and the waveguide substrate 111 of the Mach-Zehnder modulating unit (modulator chip) 101 formed on the front surface side of the carrier 302; and the relay substrate 102a and the waveguide substrate 111 of the Mach-Zehnder modulating unit (modulator chip) 101 are housed in the step difference 302a portion. As a result, the surface (electrode position) of the waveguide substrate 111 housed in the step difference (groove) 302a can be made flush with the surface (electrode position) of the carrier 302.

In the same way as the second embodiment, the electrodes 121 are disposed on the carrier 302 at the arrangement position portion (the termination portion 102b) of the termination substrate 102b described in the second embodiment. Describing the electrode 121Aa for the one Mach-Zehnder interference unit A as an example, the capacitor 131 and the terminal resistor (50Ω) 132 on the one branched electrode 121Aaa are disposed on the front surface of the carrier 302. The other branched electrode 121Aab is led out and connected to the electrode 121Aab on the back surface of the carrier 302 through the via 201a. The electrode 121Aab on the back surface of the carrier 302 includes the bias resistor 133.

According to the third embodiment, the length and width of the substrate (carrier) can be made smaller as is the case with the second embodiment, and the housing for housing the carrier can be reduced in length and width. According to the third embodiment, since the termination substrate is integrated with the carrier, the number of components can be reduced and the components can be easily handled and mounted in the housing 103.

Figure 5:
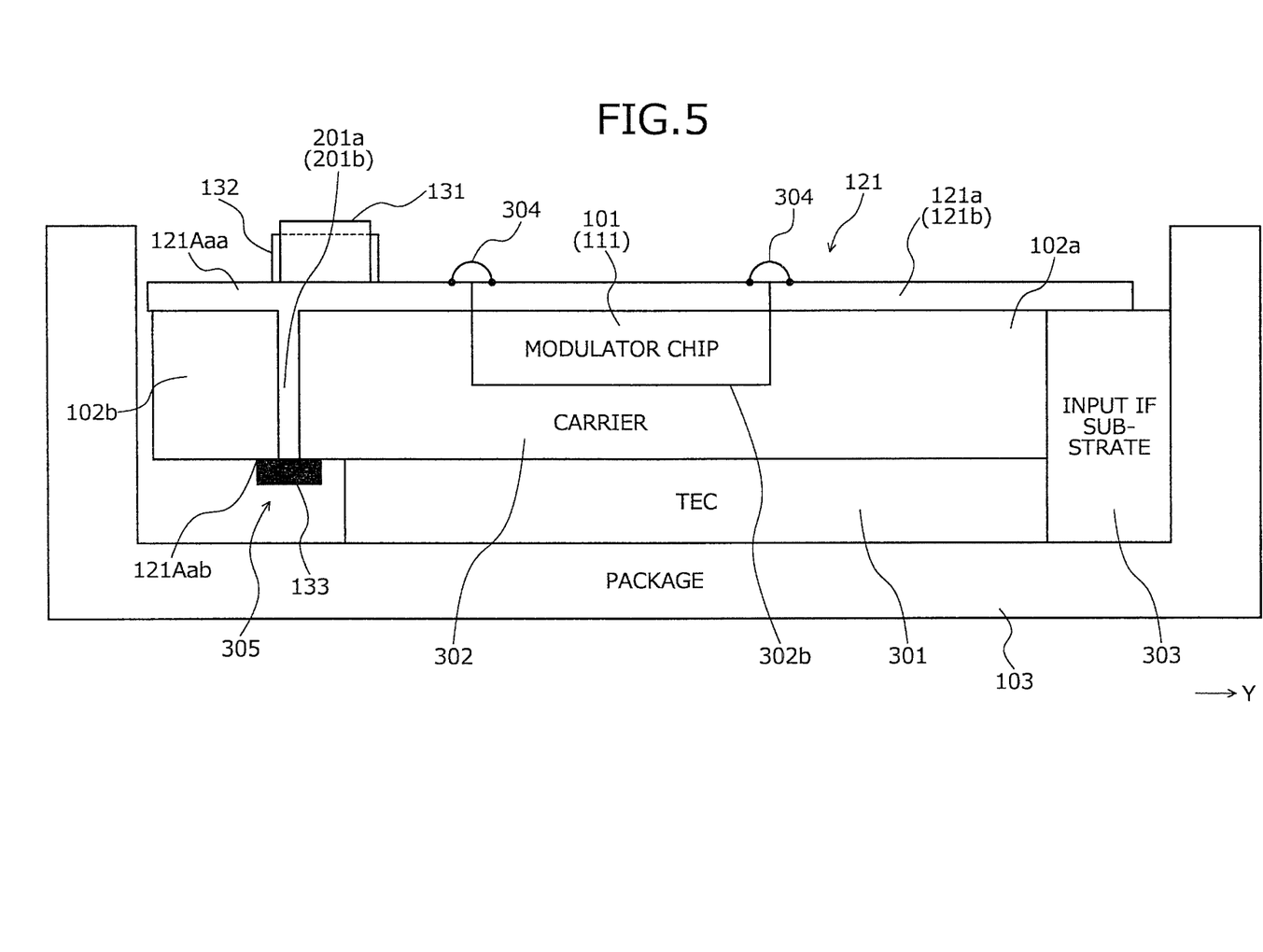
FIG. 5 is a side cross-sectional view of the optical module according to a fourth embodiment.

FIG. 5 is a side cross-sectional view of the optical module according to a fourth embodiment. In the fourth embodiment, the relay substrate 102a and the termination substrate 102b described in the second embodiment are integrally formed with the carrier 302. The other constituent elements are the same as the second and third embodiments. In the carrier 302, the relay substrate 102a described in the embodiments is referred to as a relay portion 102a, and the arrangement position of the termination substrate 102b is referred to as the termination portion 102b.

The carrier 302 is made up of a laminated substrate and has a groove (concave groove) 302b corresponding to the height of the waveguide substrate 111 of the Mach-Zehnder modulating unit (modulator chip) 101 formed at a center portion of the carrier 302, and the waveguide substrate 111 of the Mach-Zehnder modulating unit (modulator chip) 101 is housed in the concave groove 302b portion.

The electrodes 121 are disposed on the carrier 302 at the relay substrate 102a (the relay unit 102a) and the arrangement position portion (the termination portion 102b) of the termination substrate 102b described in the second embodiment. Describing the electrode 121Aa of the one Mach-Zehnder interference unit A of the termination portion 102b as an example as is the case with the third embodiment, the capacitor 131 and the terminal resistor (50Ω) 132 on the one branched electrode 121Aaa are disposed on the front surface of the carrier 302. The other branched electrode 121Aab is led out and connected to the electrode 121Aab on the back surface of the carrier 302 through the via 201a. The electrode 121Aab on the back surface of the carrier 302 includes the bias resistor 133.

According to the fourth embodiment, the length and width of the substrate (carrier) can be reduced as is the case with the second embodiment, and the housing for housing the carrier can be reduced in length and width. According to the fourth embodiment, since the relay substrate and the termination substrate are integrated with the carrier, the number of components can be reduced and the components can be easily handled and mounted in the housing 103.

Figure 6:
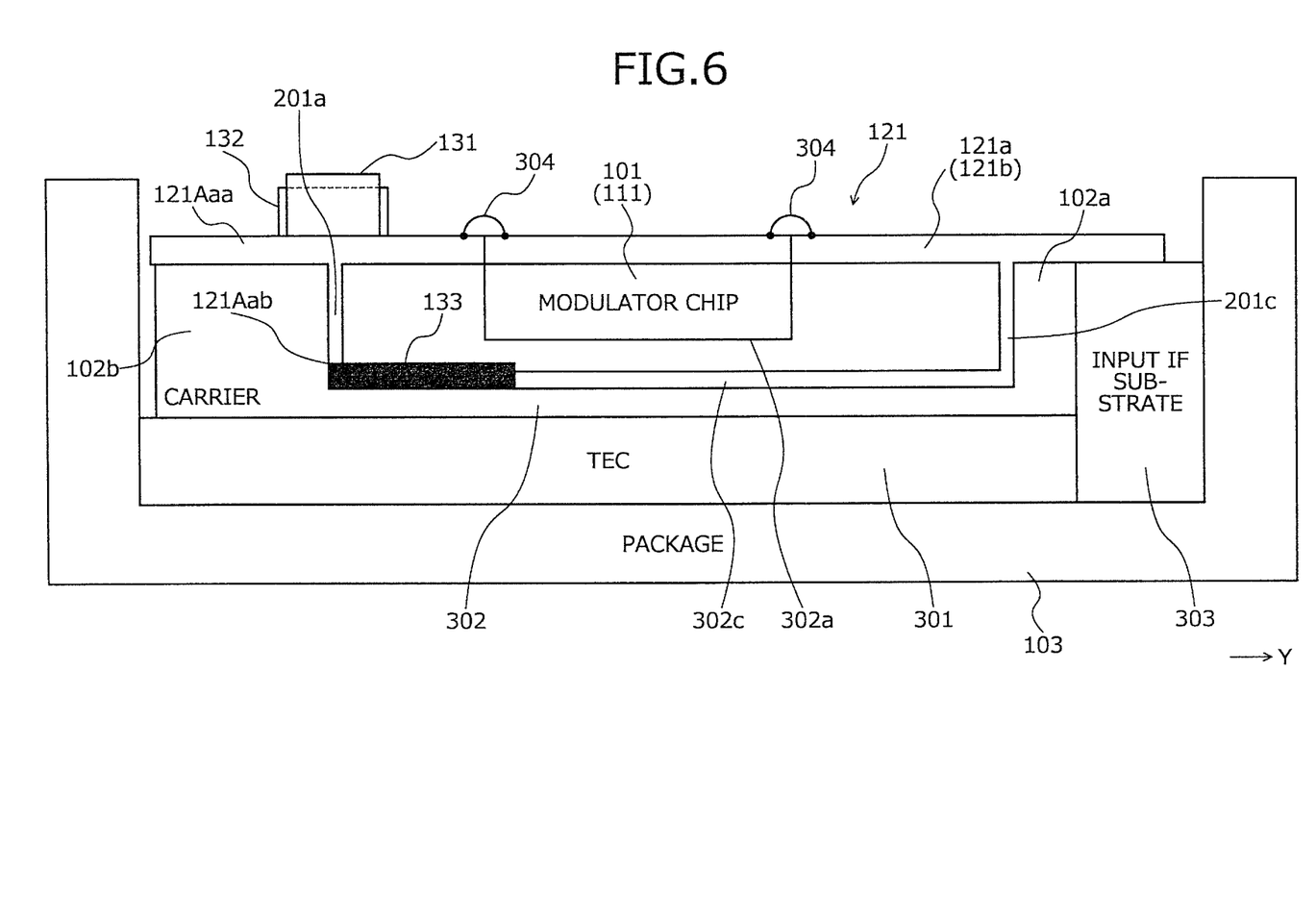
FIG. 6 is a side cross-sectional view of the optical module according to a fifth embodiment.

FIG. 6 is a side cross-sectional view of the optical module according to a fifth embodiment. In the fifth embodiment, as is the case with the fourth embodiment, the relay substrate 102a and the termination substrate 102b are integrally formed with the carrier 302. However, the wiring structure of the multiple electrodes 121 and the arrangement structure of the terminal resistor 132 are different.

As depicted in FIG. 6, the carrier 302 is made up of a laminated substrate and, when the electrode 121Aa of the one Mach-Zehnder interference unit A is described as an example, the one electrode 121Aaa after dividing the electrode 121Aa into two branches is disposed on the front surface of the carrier 302, and the capacitor 131 and the terminal resistor 132 are also disposed on the front surface of the carrier 302.

In the fifth embodiment, the other electrode 121Aab after dividing the electrode 121Aa into two branches uses inner layer wiring 302c on one layer of multilayer wirings inside the carrier 302 through the via 201a. The bias resistor 133 is disposed on this inner layer wiring 302c. The DC electrodes 121b are allowed to pass through a lower position of the waveguide substrate 111 of the Mach-Zehnder modulating unit 101, through the inner layer wiring 302c of the carrier 302; and are led out to the front surface of the carrier 302 through the via 201 near the relay portion 120a and are connected to the input IF substrate 303.

As described, in the fifth embodiment, the bias resistor 133 is not disposed on the carrier 302 and is disposed at the inner layer wiring 302c portion of the carrier 302. Because of the high resistance (several hundred to several kΩ), the bias resistor 133 requires a sufficient area on the termination portion 102b. In this regard, the bias resistor 133 can be mounted by disposing the bias resistor 133 to have a given length at the inner layer wiring 302c portion of the carrier 302. Since the bias resistor 133 can be disposed at the inner layer wiring 302c portion of the carrier 302, the mounting space of the bias resistor 133 on the carrier 302 can be reduced.

The terminal resistor 132 has a smaller resistance value, a smaller size, and is space-saving. It is difficult to dispose the capacitor 131 at the inner layer wiring 302c portion of the carrier 302.

Since the inner layer wiring 302c of the carrier 302 is used along with the bias resistor 133 for the DC electrodes 121b of the electrodes 121 in this configuration, space for disposing the DC electrodes 121b is not consumed on the carrier 302 and the size of the carrier 302 (size in the width direction) can be made smaller. The DC electrodes 121b are allowed to pass, and are led out, through the lower position of the Mach-Zehnder modulating unit 101. As a result, the DC electrodes 121b can be easily led out to the DC terminals on the opposite side without the need of electric connection, etc. at the Mach-Zehnder modulating unit 101 portion.

The arrangement of the bias resistor 133 at the inner layer wiring 302c portion of the carrier 302 eliminates the need for space to dispose the bias resistor 133 on the surface of the carrier 302 and can reduce the width of the carrier 302 (a portion corresponding to the termination portion 102b).

Figure 7:
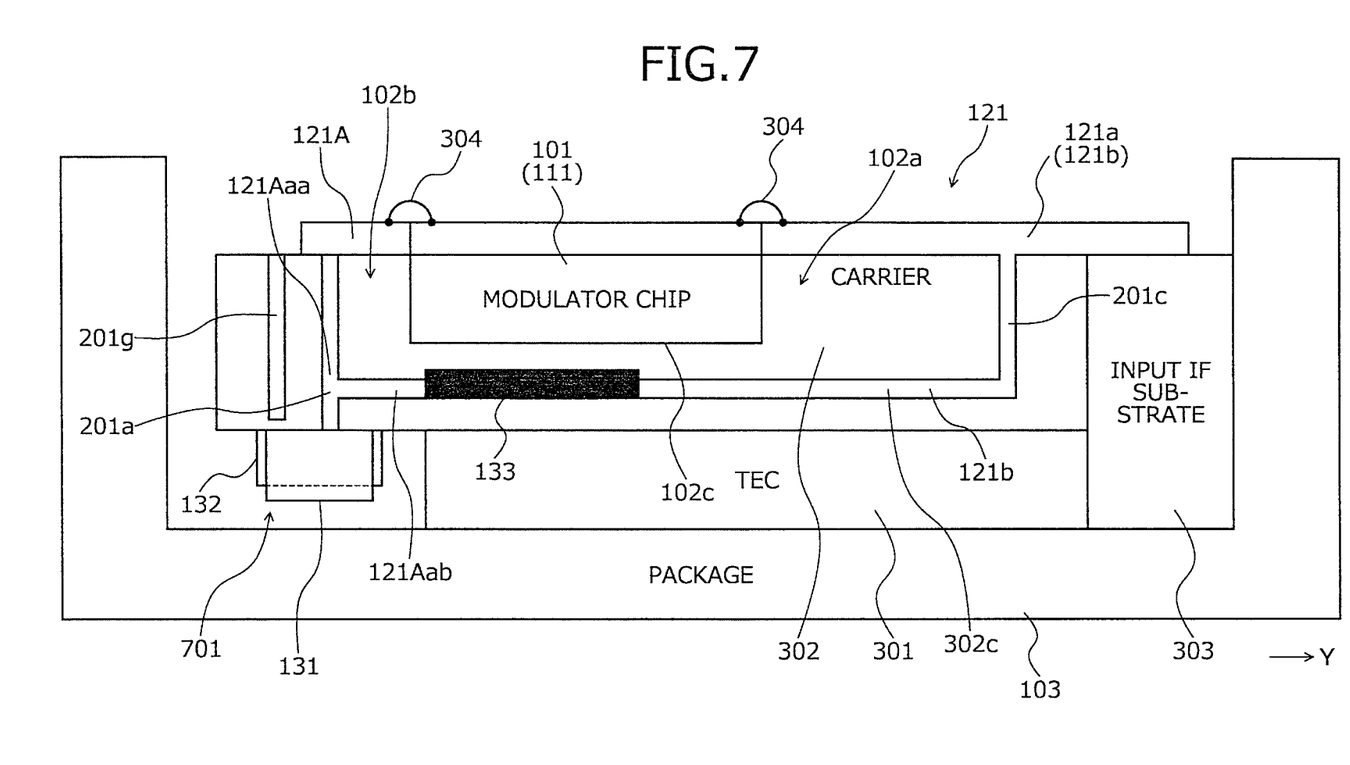
FIG. 7 is a side cross-sectional view of the optical module according to a sixth embodiment.

FIG. 7 is a side cross-sectional view of the optical module according to a sixth embodiment. In the sixth embodiment, as is the case with the fifth embodiment, the carrier 302 is provided with the functions of the relay substrate 102a and the termination substrate 102b through integral formation. The bias resistor 133 is not disposed on the carrier 302 and is disposed at the inner layer wiring 302c portion of the carrier 302.

The capacitor 131 and the terminal resistor 132 are disposed on the back surface of the carrier 302. Therefore, describing the electrode 121Aa of the one Mach-Zehnder interference unit A as an example, the electrode 121Aa is led out to the back surface of the carrier 302 through the via 201 of the carrier 302. The one electrode 121Aaa after dividing the electrode 121Aa into two branches is formed on the back surface of the carrier 302, and the capacitor 131 and the terminal resistor 132 are disposed on the electrode 121Aaa.

Since the electrode 121Aa is the RF electrode, given characteristic impedance (50Ω) must be maintained. Therefore, another one or more vias 201g adjacent to the via 201a used for the electrode 121Aa that is for signals are used as grounded ground electrodes.

The temperature adjustment cooler 301 equipped with the carrier 302 is at a position that does not interfere with the capacitor 131 and the terminal resistor 132 portion disposed on the back surface of the carrier 302 (a width avoiding the capacitor 131 and the terminal resistor 132 portion). As a result, the capacitor 131 and the terminal resistor 132 are housed in a space 701 formed by the bottom surface of the housing 103, the back surface of the carrier 302, and the side portion of the temperature adjustment cooler 301.

The other electrode 121Aab after dividing the electrode 121Aa into two branches is connected to the inner layer wiring 302c portion of the carrier 302, and the bias resistor 133 is disposed at the inner layer wiring 302c portion.

As described, since the capacitor 131 and the terminal resistor 132 are disposed on the back surface of the carrier 302 and the bias resistor 133 is disposed at the inner layer wiring 302c portion of the carrier 302, the electronic components (the capacitor 131, the terminal resistor 132, and the bias resistor 133) do not protrude on the carrier 302. As a result, according to the sixth embodiment, a size in the height (Z-axis) direction can be further reduced as compared to the fifth embodiment.

Figure 8:
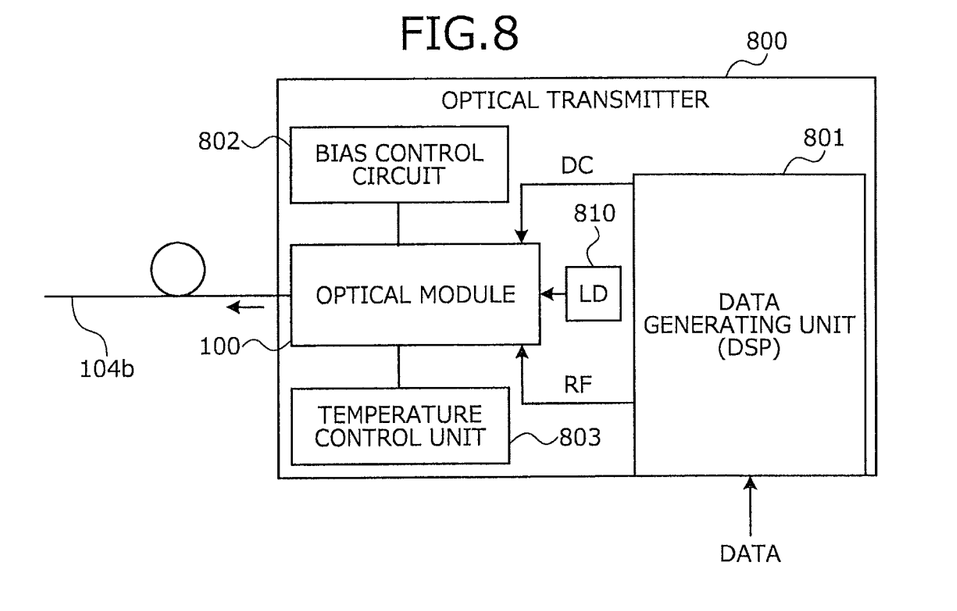
FIG. 8 is a block diagram of a configuration example of an optical transmitter according to a seventh embodiment.

FIG. 8 is a block diagram of a configuration example of an optical transmitter according to a seventh embodiment. An optical transmitter 800 includes the optical module 100 of the embodiments described above, a data generating unit 801, and a laser diode (LD) light source 810. The data generating unit 801 may be configured using a digital signal processor (DSP), for example. The data generating unit 801 outputs input data for transmission (two individual data) as high-speed microwave signals (electronic signals) to the RF electrodes 121a of the optical module 100. The data generating unit 801 controls the bias points of the Mach-Zehnder interference units A and B through the DC electrodes 121b of the optical module 100. In the configuration example of FIG. 1, the data generating unit 801 controls the off points through the DC electrodes 121c and controls the orthogonal phases through the DC electrodes 121d.

Additionally, in the configuration example of FIG. 2, a bias control circuit 802 provides polarization control for the polarization rotating unit 211 and the polarization multiplexing unit 212 such that polarization states of light of two sets of the parallel waveguides 112A, 112B are orthogonal to each other. Additionally, a temperature control unit 803 provides temperature control of the temperature adjustment cooler 301 to keep the optical module 100 at constant temperature in response to a change in ambient temperature, etc.

The light of the LD light source 810 is input to the optical module 100 and the two individual data are multiplexed by a pair of the Mach-Zehnder interference units A, B according to the modulation mode described above (such as QPSK and DP-DPSK) before output from the optical fiber 104b.

Figure 9:
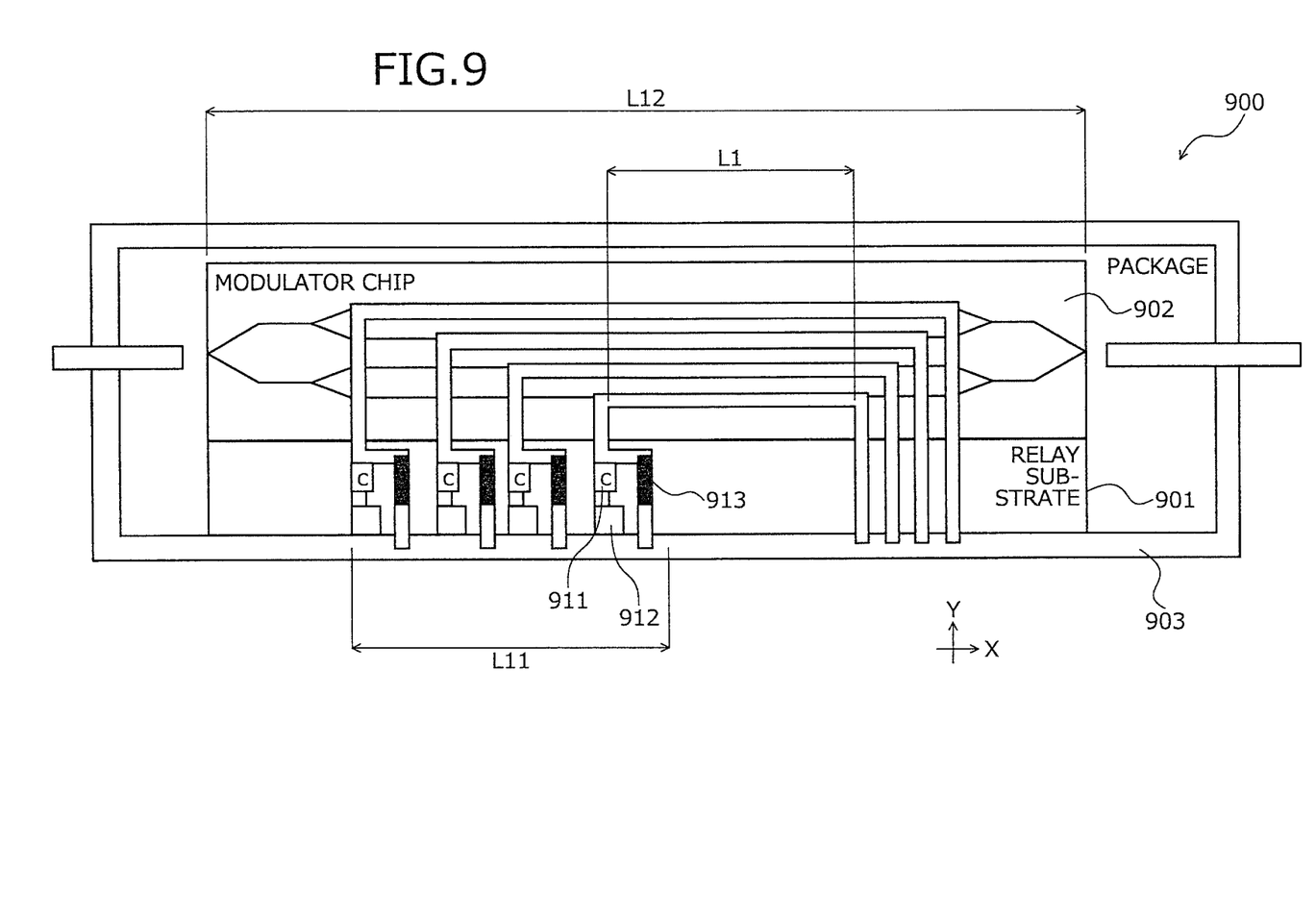
FIG. 9 is a plane view of a configuration example of another optical module for comparison with the embodiments.

FIG. 9 is a plane view of a configuration example of another optical module for comparison with the embodiments. A pair of the Mach-Zehnder interference units A, B (operation length L1) is disposed in parallel on a modulator chip 902, and the electrode terminals and the electronic components (a capacitor 911, a terminal resistor 912, and a bias resistor 913) described above are arranged on a relay terminal 901 in the configuration example. The arrangements of the DC electrodes 121c, 121d for phase control described in the first embodiment (FIG. 1) and the polarization rotating unit 211 and the polarization multiplexing unit 212 for polarization control described in the second embodiment (FIG. 2) are not depicted in FIG. 9.

An optical modulator 900 depicted in FIG. 9 has a configuration in which simply, the electronic components (the capacitor 911, the terminal resistor 912, and the bias resistor 913) on multiple electrodes are arranged in parallel along the X-axis direction. The length L1 is required for the arrangement of the electronic components (the capacitor 911, the terminal resistor 912, and the bias resistor 913). A length L12 of the relay terminal 901 requires a length L11 for the arrangement of electronic components in addition to the operation length L1 and increases in size in the length direction, and the housing 903 also increases in size in the length direction according to the length L12 of the relay terminal 901. In the state of FIG. 9, electrodes are different in length (operation length L1) in the Mach-Zehnder interference units A, B. Therefore, actually, the lengths of multiple electrodes disposed in parallel with the optical waveguide must be made the same and the arrangement of electrodes at locations longer than the operation length L1 must be devised in such a manner as to divert the electrodes from the optical waveguide.

In contrast, the optical module 100 of the embodiments has the electrodes 121 disposed to be distributed in the length (X-axis) direction (divided in two parts in directions opposite to each other) as depicted in FIG. 1, etc. The electrodes 121 distributed in the length direction are disposed at positions overlapping with the operation length L1 required for the Mach-Zehnder interference units A, B in the length direction. As a result, the electrodes 121 required for the arrangement of the electronic components (the capacitor 911, the terminal resistor 912, and the bias resistor 913) mounted on the termination substrate 102b can be shortened in the length direction. In the example of the first embodiment (FIG. 1), the length L2 of the termination substrate (termination portion) 102b can be reduced as compared to the length L12 of the relay terminal 901 depicted in FIG. 9.

In the case of the configuration with the other branched electrode 121Aab led out to the back side of the termination substrate 102b or the configuration using the inner layer wiring, the space for disposing the bias resistor 913 disposed on the other electrode 121Aab can be efficiently arranged and the width W1 of the termination substrate (termination portion) 102b can be reduced to achieve further size reductions.

Although the optical modulator is taken as an example of the optical module in the embodiments, an optical switch is also applicable that has the same configuration to perform a switching operation by inversion of the voltage applied to the electrodes 121.

According to one embodiment, size reductions can be achieved.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical module comprising:
a waveguide substrate having an optical waveguide and multiple electrodes causing electronic signals to be applied to the optical waveguide;
a relay substrate disposed adjacently to the waveguide substrate; and
a termination substrate disposed adjacently to the waveguide substrate on a side opposite to the relay substrate and thereby, sandwiching the waveguide substrate therebetween, wherein
the electrodes respectively have a first wiring portion connected from the relay substrate through the waveguide substrate to the termination substrate and a second wiring portion extending from the first wiring portion and branching on the termination substrate,
in the second wiring portion, one branched wiring portion has a capacitor and a termination resistor, and another branched wiring portion is extended through a bias resistor to a DC electrode on the relay substrate, and
the second wiring portion is divided into a first group extending in a first direction along the optical waveguide and a second group extending in a direction opposite to the first direction.

2. An optical module comprising:
an optical waveguide having a pair of parallel waveguides;
a pair of electrodes disposed along the pair of parallel waveguides and to which electronic signals are applied;
a waveguide substrate having the pair of optical waveguides and the pair of electrodes in plural;
a relay substrate disposed adjacently to the waveguide substrate; and
a termination substrate disposed adjacently to the waveguide substrate on a side opposite to the relay substrate and thereby, sandwiching the waveguide substrate therebetween, wherein
the electrodes respectively have a first wiring portion extended from the relay substrate through the waveguide substrate to the termination substrate and a second wiring portion extending from the first wiring portion and branching on the termination substrate,
in the second wiring portion, one branched wiring portion has a capacitor and a termination resistor, and another branched wiring portion is extended through a bias resistor to a DC electrode on the relay substrate, and
the second wiring portion is divided into a first group extending in a first direction along the optical waveguide and a second group extending in a direction opposite to the first direction.

3. The optical module according to claim 1, wherein
the other branched wiring portion is led out to a back surface of the termination substrate through a via of the termination substrate, and
the bias resistor is disposed on the back surface of the termination substrate.

4. The optical module according to claim 3, wherein the one branched wiring portion and the other branched wiring portion are disposed at substantially the same positions on a front surface and the back surface of the termination substrate.

5. The optical module according to claim 1, wherein the termination substrate is integrated with a carrier substrate disposed on a temperature control cooler.

6. The optical module according to claim 5, wherein the relay substrate is integrated with the carrier substrate.

7. The optical module according to claim 5, wherein
the carrier substrate is a laminated substrate, and
the other branched wiring portion is connected to inner layer wiring of the carrier substrate through a via of the carrier substrate.

8. An optical module comprising:
a waveguide substrate having an optical waveguide and multiple electrodes that cause electronic signals to be applied to the optical waveguide;
a relay substrate disposed adjacently to the waveguide substrate; and
a termination substrate disposed adjacently to the waveguide substrate on a side opposite to the relay substrate and thereby, sandwiching the waveguide substrate therebetween, wherein
in the second wiring portion, one branched wiring portion has a capacitor and a termination resistor, and another branched wiring portion is extended through a bias resistor and a carrier substrate to a DC electrode on the relay substrate, and
the bias resistor is disposed at an inner layer wiring portion of the carrier substrate.

9. An optical module comprising:
a waveguide substrate having an optical waveguide and multiple electrodes that cause electronic signals to be applied to the optical waveguide;
a relay substrate disposed adjacently to the waveguide substrate; and
a termination substrate disposed adjacently to the waveguide substrate on a side opposite to the relay substrate and thereby, sandwiching the waveguide substrate therebetween, wherein
in the second wiring portion, one branched wiring portion has a capacitor and a termination resistor, and another branched wiring portion is extended through a bias resistor and a carrier substrate to a DC electrode on the relay substrate, and
the one branched wiring portion is led out to a back surface of the termination substrate through a via of the termination substrate, and
the capacitor and the termination resistor are disposed on a back surface of the carrier substrate.

10. The optical module according to claim 9, wherein another one or more vias adjacent to the via of the other branched wiring portion are regarded as grounded ground electrodes.

11. The optical module according to claim 5, wherein a groove housing the waveguide substrate is formed in a front surface of the carrier substrate.

12. The optical module according to claim 11, wherein the groove has a depth making the front surface of the carrier substrate flush with a front surface of the waveguide substrate.

13. An optical transmitter comprising:
an optical module including:
a waveguide substrate having an optical waveguide and multiple electrodes that cause electronic signals to be applied to the optical waveguide;
a relay substrate disposed adjacently to the waveguide substrate; and
a termination substrate disposed adjacently to the waveguide substrate on a side opposite to the relay substrate and thereby, sandwiching the waveguide substrate therebetween, wherein
the electrodes respectively have a first wiring portion connected from the relay substrate through the waveguide substrate to the termination substrate and a second wiring portion extending from the first wiring portion and branching on the termination substrate,
in the second wiring portion, one branched wiring portion has a capacitor and a termination resistor, wherein another branched wiring portion is extended through a bias resistor to a DC electrode on the relay substrate, and
the second wiring portion is divided into a first group extending in a first direction along the optical waveguide and a second group extending in a direction opposite to the first direction;
a data generating unit configured to supply as the electronic signals and to the multiple electrodes individually, data for transmission, and configured to supply a drive signal for modulation by the optical waveguide through the DC electrode; and
a bias control circuit providing control such that polarization states of light of the optical waveguide are orthogonal to each other.

14. The optical transmitter according to claim 13, wherein
the other branched wiring portion is led out to a back surface of the termination substrate through a via of the termination substrate, and
the bias resistor is disposed on the back surface of the termination substrate.

15. The optical module according to claim 2, wherein
the other branched wiring portion is led out to a back surface of the termination substrate through a via of the termination substrate, and
the bias resistor is disposed on the back surface of the termination substrate.

16. The optical module according to claim 15, wherein the one branched wiring portion and the other branched wiring portion are disposed at substantially the same positions on a front surface and the back surface of the termination substrate.

17. The optical module according to claim 2, wherein the termination substrate is integrated with a carrier substrate disposed on a temperature control cooler.

18. The optical module according to claim 17, wherein the relay substrate is integrated with the carrier substrate.

19. The optical module according to claim 17, wherein
the carrier substrate is a laminated substrate, and
the other branched wiring portion is connected to inner layer wiring of the carrier substrate through a via of the carrier substrate.

20. The optical module according to claim 9, wherein a groove housing the waveguide substrate is formed in a front surface of the carrier substrate.

21. The optical module according to claim 20, wherein the groove has a depth making the front surface of the carrier substrate flush with a front surface of the waveguide substrate.

* * * * *